United States Patent
Pierce et al.

(10) Patent No.: US 9,699,004 B2
(45) Date of Patent: Jul. 4, 2017

(54) BARCODE READING SYSTEM INCLUDING A SLED READER AND RELAY APPLICATION

(71) Applicant: The Code Corporation, Draper, UT (US)

(72) Inventors: Steve Pierce, West Jordan, UT (US); Jonathan Bosley, Saratoga Springs, UT (US)

(73) Assignee: The Code Corporation, Draper, UT (US)

( * ) Notice: Subject to any disclaimer, the term of this patent is extended or adjusted under 35 U.S.C. 154(b) by 133 days.

(21) Appl. No.: 14/319,193

(22) Filed: Jun. 30, 2014

(65) Prior Publication Data

US 2015/0379315 A1 Dec. 31, 2015

(51) Int. Cl.
| | |
|---|---|
| *H04L 12/64* | (2006.01) |
| *H04L 29/08* | (2006.01) |
| *H04W 4/00* | (2009.01) |
| *G06K 7/10* | (2006.01) |
| *G06K 7/00* | (2006.01) |
| *H04L 12/54* | (2013.01) |
| *H04L 29/06* | (2006.01) |

(52) U.S. Cl.
CPC ........ *H04L 12/6418* (2013.01); *G06K 7/0017* (2013.01); *G06K 7/10386* (2013.01); *H04L 12/569* (2013.01); *H04L 29/06095* (2013.01); *H04L 67/2823* (2013.01); *H04W 4/00* (2013.01); *H04W 4/003* (2013.01)

(58) Field of Classification Search
CPC .............. H04L 12/6418; H04L 12/569; H04L 67/2823; H04W 4/00; H04W 4/003; G06K 7/0017; G06K 7/10386
See application file for complete search history.

(56) References Cited

U.S. PATENT DOCUMENTS

| | | | | |
|---|---|---|---|---|
| 5,347,113 A * | 9/1994 | Reddersen | ................ | G06F 1/18 235/436 |
| 5,604,516 A * | 2/1997 | Herrod | .................... | G06F 3/023 345/168 |
| 6,512,919 B2 * | 1/2003 | Ogasawara | .......... | G06Q 20/208 186/61 |
| 7,556,203 B2 * | 7/2009 | Robinson | ........... | G06K 7/10881 235/462.45 |
| 8,346,979 B1 * | 1/2013 | Lee | ....................... | G06F 1/1632 235/449 |
| 8,856,033 B2 * | 10/2014 | Hicks | ................... | G07G 1/0081 235/385 |
| 2001/0021931 A1 * | 9/2001 | Vaughan | ............. | G06F 17/3071 |
| 2001/0035459 A1 * | 11/2001 | Komai | ............... | G06K 17/0022 235/462.25 |
| 2001/0041581 A1 * | 11/2001 | Hansson | ............. | H04M 1/2755 455/557 |

(Continued)

*Primary Examiner* — Daniel Walsh
(74) *Attorney, Agent, or Firm* — Timothy P. O'Hagan; Ray Quinney & Nebeker

(57) ABSTRACT

The present disclosure provides a relay application configured to send decoded barcode image data to an intermediary device as text via a TCP/IP connection. The relay application is executed by a processor of a mobile device that is in communication with the barcode sled reader. The barcode sled reader includes a barcode reader that generates image data of a barcode and a decoding processor that decodes the image data.

5 Claims, 5 Drawing Sheets

(56) References Cited

U.S. PATENT DOCUMENTS

| | | | | |
|---|---|---|---|---|
| 2002/0027164 A1* | 3/2002 | Mault | A61B 5/1118 | 235/462.46 |
| 2002/0066788 A1* | 6/2002 | Knowles | G06F 17/30879 | 235/462.01 |
| 2002/0078206 A1* | 6/2002 | Boies | G06F 17/30067 | 709/226 |
| 2002/0185537 A1* | 12/2002 | Konda | G06F 17/30879 | 235/462.01 |
| 2003/0001017 A1* | 1/2003 | Konda | G06K 7/10851 | 235/462.15 |
| 2003/0065784 A1* | 4/2003 | Herrod | H04W 28/18 | 709/227 |
| 2003/0071126 A1* | 4/2003 | Waxelbaum | G06K 17/0022 | 235/462.25 |
| 2003/0088442 A1* | 5/2003 | Michael | G06F 19/327 | 705/3 |
| 2003/0106940 A1* | 6/2003 | Bukowski | G06F 19/3462 | 235/462.45 |
| 2003/0145065 A1* | 7/2003 | Keller | G06F 17/30887 | 709/219 |
| 2003/0173405 A1* | 9/2003 | Wilz, Sr. | G06F 17/30879 | 235/462.01 |
| 2003/0201320 A1* | 10/2003 | Venkatesh | G06K 17/00 | 235/383 |
| 2003/0222150 A1* | 12/2003 | Sato | G06F 1/1626 | 235/472.02 |
| 2005/0090233 A1* | 4/2005 | Chambers | G06F 17/30879 | 455/412.1 |
| 2005/0224571 A1* | 10/2005 | Kelley | G06F 17/243 | 235/375 |
| 2006/0046793 A1* | 3/2006 | Hamilton | H04M 1/0202 | 455/575.1 |
| 2006/0238334 A1* | 10/2006 | Mangan | G06Q 10/0833 | 340/539.13 |
| 2007/0145138 A1* | 6/2007 | Snyder | G06K 7/10544 | 235/462.01 |
| 2007/0152058 A1* | 7/2007 | Yeakley | G06F 17/2247 | 235/462.01 |
| 2009/0001173 A1* | 1/2009 | Sevier | G06K 7/10851 | 235/462.41 |
| 2009/0084840 A1* | 4/2009 | Williams | G06Q 30/00 | 235/379 |
| 2010/0125650 A1* | 5/2010 | Scheering | H04L 29/12066 | 709/220 |
| 2012/0071095 A1* | 3/2012 | Sims | G06F 13/4045 | 455/41.2 |
| 2012/0286048 A1* | 11/2012 | Liu | G06K 7/01 | 235/462.48 |
| 2013/0109316 A1* | 5/2013 | Lee | H04M 1/725 | 455/41.2 |
| 2014/0061312 A1* | 3/2014 | Tien | G06K 7/10544 | 235/462.33 |
| 2014/0129305 A1* | 5/2014 | Frame | G06Q 30/0207 | 705/14.13 |
| 2015/0041544 A1* | 2/2015 | Chen | G06K 7/10722 | 235/462.1 |
| 2015/0220766 A1* | 8/2015 | Russell | G06K 7/10881 | 235/462.42 |
| 2015/0317503 A1* | 11/2015 | Powell | G06K 7/10831 | 235/455 |
| 2015/0356336 A1* | 12/2015 | Hoobler | G06K 7/089 | 235/455 |
| 2015/0379315 A1* | 12/2015 | Pierce | H04L 12/00 | 235/462.15 |
| 2016/0104016 A1* | 4/2016 | Deal | G06K 7/0004 | 235/462.15 |
| 2016/0188934 A1* | 6/2016 | Powell | G06K 7/10564 | 235/462.42 |
| 2016/0321485 A1* | 11/2016 | Utykanski | G06K 7/10811 | |

* cited by examiner

BARCODE READING SYSTEM INCLUDING A SLED READER AND RELAY APPLICATION

TECHNICAL FIELD

The present disclosure relates generally to barcode readers.

BACKGROUND

The term barcode sled reader is an industry term for a type of barcode reader which forms a case around a smart phone or similar portable computing device and includes a functional barcode reader engine (e.g. light source photo sensor, optics and a processor for decoding barcodes). When the smart phone is encased by the barcode sled reader the smart phone's power/data connector is mated to a corresponding connector of the sled reader.

In operation, decoded barcode data is provided by the sled reader to the smart phone and received by an application running on the smart phone. The application uses the barcode data within its work flow which typically includes formatting the barcode data, combining it with other information, which may include generating an XML file inclusive of the barcode data, and sending the XML file to a remote server using the smart phone's WI-FI connection, cellular data connection, or other communication connection.

Many hospitals and other organizations maintain legacy client/server systems for managing their operations. A client application operates on several computers and includes work flows used by personnel to perform various tasks. The users may input data into fields of the client application workflow using the computer's keyboard. A barcode reader may also be coupled to the computer via a point to point connection such as USB or Bluetooth and may also be used to enter data read from a barcode into fields of the application client workflow. Data input to the client application by the user, whether by keyboard or barcode, may be transferred to the legacy server over a network in a traditional manner.

SUMMARY

A problem exists in that typically barcode sled readers are not useful in this type of environment because the legacy server is not capable of receiving barcode data directly from a barcode reader/smart phone over a network connection unless and until an application for the smart phone is written and the server software is modified to support the smart phone application. A barcode reading system is needed that allows a barcode sled reader connected to a mobile device to provide barcode data to such legacy systems.

The present disclosure provides a relay application—executed by a processor of a mobile device—configured to send decoded barcode image data received from a barcode sled reader to an intermediary device, which may be a PC operating client software of a legacy client/server system, as plain text via a TCP/IP connection.

According to one aspect of the disclosure, there is provided a barcode reading system including a relay application configured to be stored on a non-transitory computer readable medium of a mobile device and executed by a processor of the mobile device and a barcode sled reader configured to connect to the mobile device. The barcode sled reader includes a barcode reader configured to generate image data of a barcode, a decoding processor configured to receive the image data from the barcode reader, decode the image data, and send the decoded image data to the relay application as executed by the processor of the mobile device. The system also includes a tool application executed by a processor of an intermediary device and in communication with a legacy system. The relay application is configured to receive the decoded image data from the barcode sled reader and cause the processor of the mobile device to send the decoded image data via a TCP/IP connection from the mobile device to the tool application of the legacy system. The tool application is configured to receive the decoded image data from the relay application and provide the decoded image data to an application for transfer to a remote server.

Alternatively or additionally, the remote server is not accessible by the mobile device via a TCP/IP connection.

Alternatively or additionally, the tool application provides the decoded barcode image data to the application for transfer to the remote server by input of the decoded barcode image data into a data entry field of a user interface form as text at the then current location of a text cursor.

Alternatively or additionally, the mobile device includes a hardware data connector, the barcode sled reader includes a corresponding hardware data connector coupled to the hardware data connector of the mobile device and forming a data interface between the barcode sled reader and the mobile device, and the barcode sled reader sends the decoded image data to the relay application through data interface between the barcode sled reader and the mobile device.

Alternatively or additionally, the mobile device includes a point-to-point wireless interface, the barcode sled reader includes a corresponding point-to-point wireless interface forming a wireless data link between the barcode sled reader and the mobile device, and the barcode sled reader sends the decoded image data to the relay application through wireless data link between the barcode sled reader and the mobile device.

According to another aspect of the disclosure, there is provided a barcode reading system including a barcode sled reader configured to connect to a mobile device and a relay application configured to be stored on a non-transitory computer readable medium of the mobile device and executed by a processor of the mobile device. The barcode sled reader includes a barcode reader configured to generate image data of a barcode and a decoding processor configured to receive the image data from the barcode reader, decode the image data, and send the decoded image data as plain text to the relay application as executed by the processor of the mobile device. The relay application is configured to receive the plain text decoded image data from the barcode sled reader and cause the processor of the mobile device to send the plain text decoded image data received from the barcode sled reader via a TCP/IP connection from the mobile device to the intermediary device as plain text and without further processing by the mobile device.

Alternatively or additionally, the plain text decoded image data received from the barcode sled reader is not combined with other data prior to being sent to the intermediary device.

Alternatively or additionally, the mobile device includes a hardware data connector, the barcode sled reader includes a corresponding hardware data connector coupled to the hardware data connector of the mobile device and forming a data interface between the barcode sled reader and the mobile device, and the barcode sled reader sends the decoded image data to the relay application through data interface between the barcode sled reader and the mobile device.

Alternatively or additionally, the mobile device includes a point-to-point wireless interface, the barcode sled reader includes a corresponding point-to-point wireless interface forming a wireless data link between the barcode sled reader and the mobile device, and the barcode sled reader sends the decoded image data to the relay application through wireless data link between the barcode sled reader and the mobile device.

According to a further aspect of the disclosure, there is provided a relay application configured to be stored on a non-transitory computer readable medium of a mobile device and to be executed by a processor of the mobile device. The relay application is additionally configured to receive plain text decoded image data of a barcode from a barcode sled reader connected to the mobile device and cause the plain text decoded image data received from the barcode sled reader to be sent via a TCP/IP connection to the intermediary device as plain text without further processing by the mobile device.

Alternatively or additionally, the decoded image data is sent to the intermediary device such that the decoded image data is generated as text within a work flow of the intermediary device.

Alternatively or additionally, plain text is unencrypted unformatted text.

Alternatively or additionally, the plain text decoded image data received from the barcode sled reader is not combined with other data prior to being sent to the intermediary device.

A number of features are described herein with respect to embodiments of the disclosure. It will be appreciated that features described with respect to a given embodiment also may be employed in connection with other embodiments.

The disclosure includes the features described herein, including the description, the annexed drawings, and, if appended, the claims, which set forth in detail certain illustrative embodiments. These embodiments are indicative, however, of but a few of the various ways in which the principles of the disclosure may be employed.

DETAILED DESCRIPTION

The present disclosure provides a relay application configured to send decoded barcode image data to an intermediary device as plain text via a TCP/IP connection. The relay application is executed by a processor of a mobile device that is in communication with the barcode sled reader. The barcode sled reader includes a barcode reader that generates image data of a barcode and a decoding processor that decodes the image data.

Figure 1:
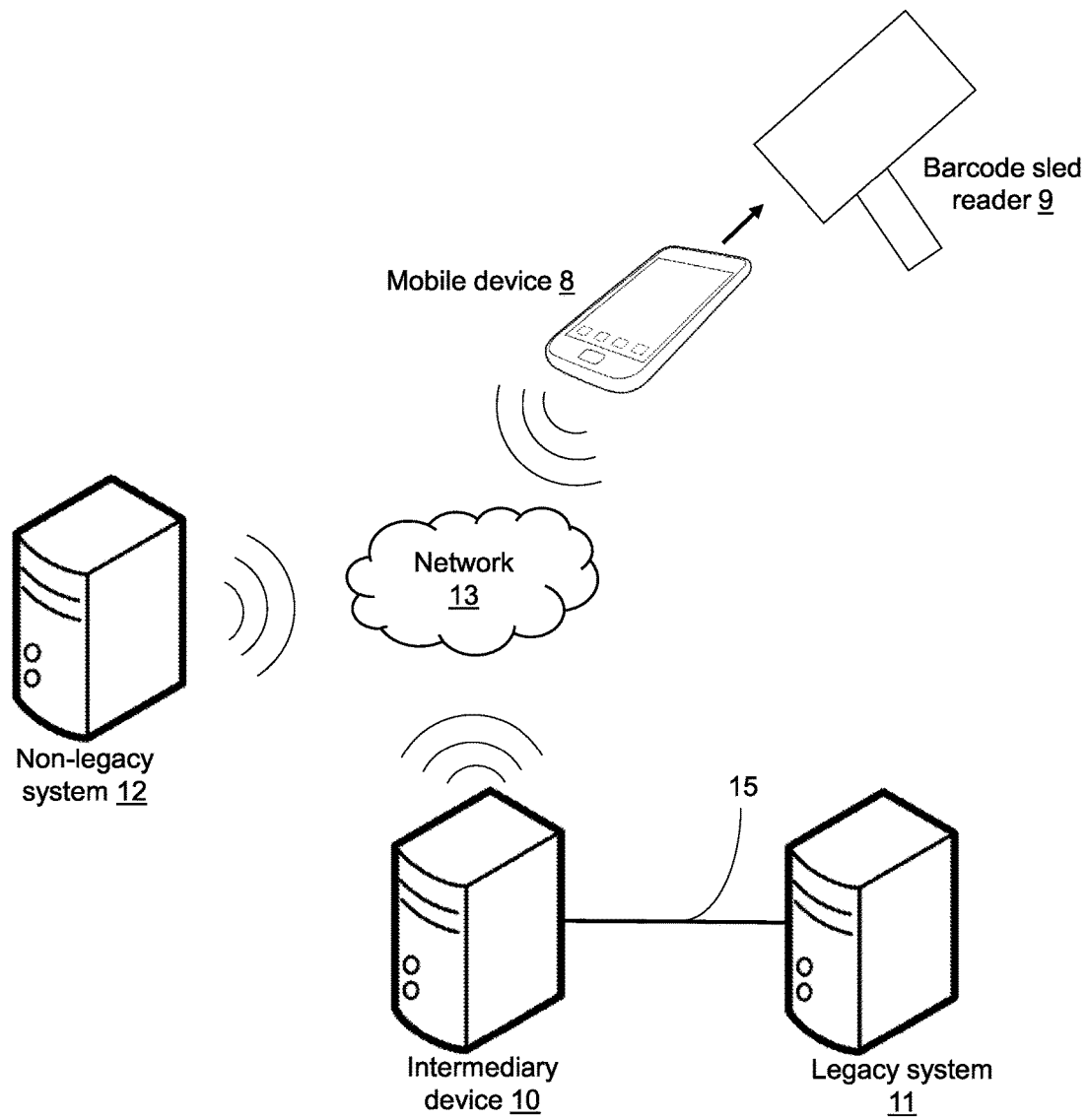
FIG. 1 depicts a barcode sled reader, a mobile device, an intermediate device, and a legacy system.

FIG. 1 depicts communication between a mobile device 8, barcode sled reader 9, intermediary device 10, legacy system 11, and non-legacy system 12. The mobile device 8 and sled reader 9 together communicate with a network 13 via a TCP/IP connection. The intermediary device 10 and non-legacy system 12 similarly communicate with the network 13 via a TCP/IP connection. The intermediary device 10 communicates with the legacy system 11 via network connection 15, which may be a local non-TCP/IP connection.

The mobile device 8 may communicate decoded image data of a barcode to: i) the non-legacy system 12 under control of a non-legacy application 21 (discussed herein) operated on the mobile device 8 that is compatible with the non-legacy system 12; and/or ii) the intermediary device 10 via the TCP/IP connection using a relay application 20 (discussed herein) operating on the mobile device 8. The legacy system 11 is incapable of receiving decoded image data from a barcode directly from the mobile device 8 via a TCP/IP connection and the relay application 20 functions independently of, and requires no compatibility with, the communication protocols and functions of the legacy system 11, including those used for communication between the legacy system 11 and the intermediary device 10.

In order to communicate image data with the legacy system 11, the mobile device 8 communicates the image data to the intermediary device 10 via the TCP/IP connection. The intermediary device 10 then communicates the image data received from the mobile device 8 to the legacy system 11 via the connection 15.

Figure 2A:
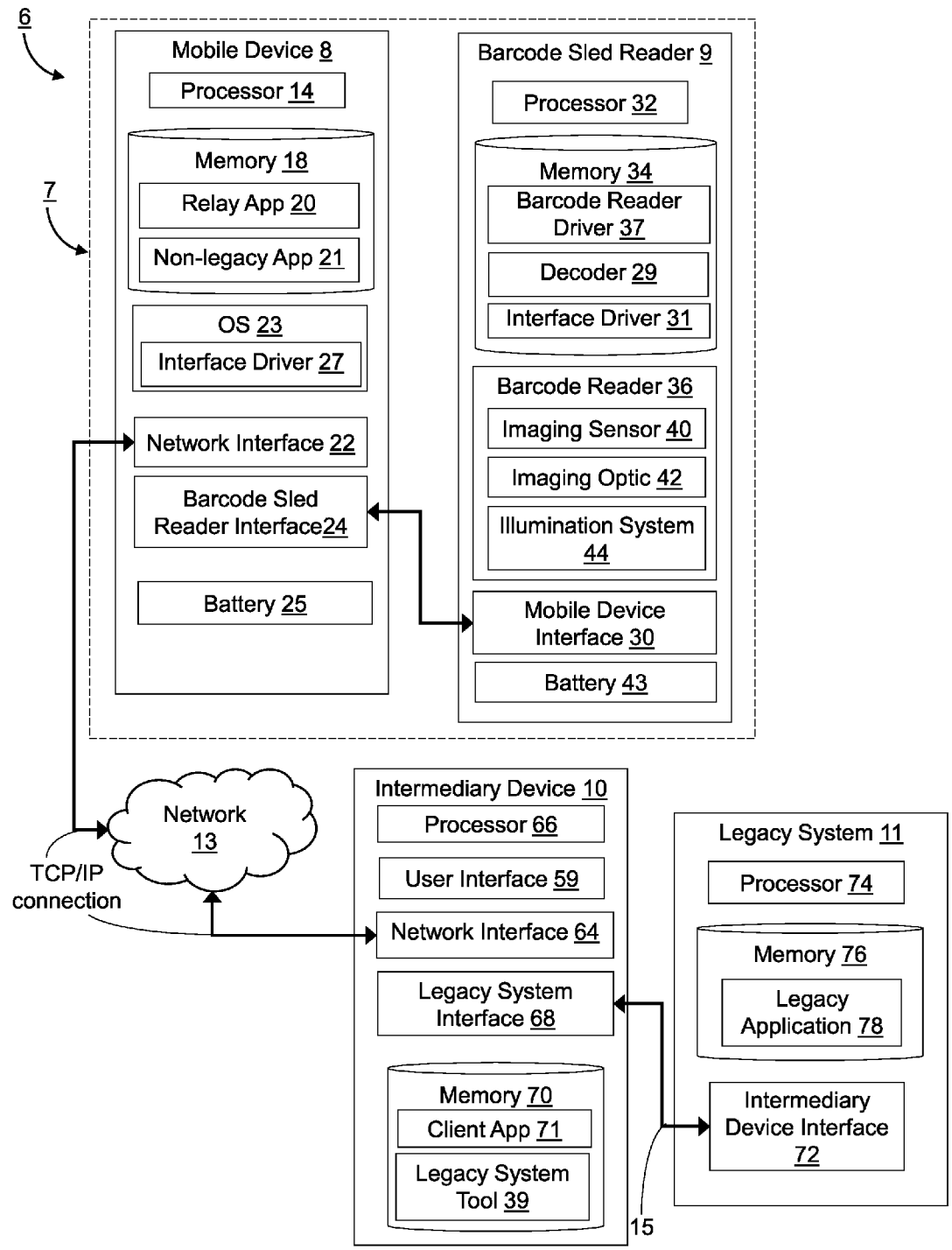
FIG. 2A depicts a barcode interface system including a barcode reading system, an intermediary device, and a legacy system.

Turning to FIG. 2A, a barcode interface system 6 including a barcode reading system 7 is shown. The barcode reading system 7 includes the mobile device 8 and the barcode sled reader 9. The mobile device 8 includes: i) a processor 14, ii) a non-transitory computer readable medium 18 storing a relay application 20, a network interface 22, and an operating system 23, each executable by the processor 14; iii) a barcode sled reader interface 24; and iv) a rechargeable battery 25 for powering each of the above described components. A component of the operating system 23 may include an interface driver 27 which controls operating of the barcode sled reader interface 24 for communication with the barcode sled reader 9 as described herein.

The barcode sled reader 9 includes: i) a processor 32, ii) a non-transient computer readable a medium 34 storing a decoder 29 and an interface driver 31, iii) barcode reader hardware 36 which may include an image sensor 40, imaging optics 42, and an illumination system 44; iv) a mobile device interface 30; and v) a battery 43 for powering each of the above describe components and optionally providing supplemental power to the mobile device 8.

The mobile device 8 and the barcode sled reader 9 are communicatively coupled to one another via the barcode sled reader interface 24 and a mobile device interface 30 of the barcode sled reader 9.

Figure 2B:
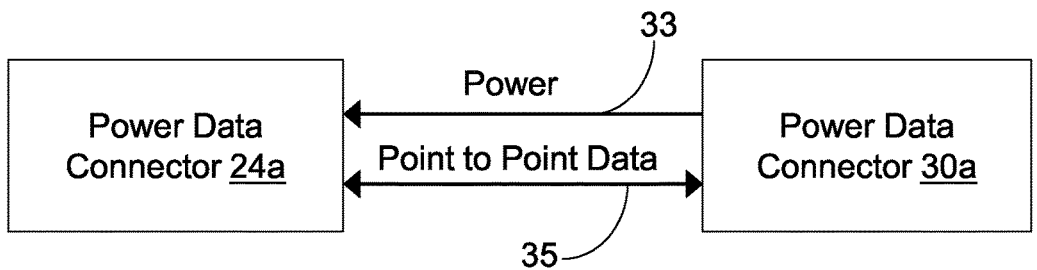
FIG. 2B depicts an embodiment where a barcode sled reader is coupled to a mobile device by a physical power/data connector.

Turning briefly to FIG. 2B in conjunction with FIG. 2A, in one embodiment the barcode sled reader interface 24a may be a hardware power/data connector and the mobile device interface 30a may be a corresponding hardware power/data connector such that when the two connectors 24a, 30a are coupled, both: i) a power connection 33 is established for providing supplemental operating power from battery 43 of the barcode sled reader 9 to the mobile device 8, which may be in the form of power for charging battery 25; and ii) a point to point hardware communication interface 35 is established for data communication between the processor 32 of the barcode sled reader 9 and processor 14 of the mobile device 8. The point to point hardware communication interface 35 may be USB or any other serial (or parallel) interface which provides for communication of data between two separate computing systems or two computing systems, each operating under control of a separate processor and not sharing addressable memory space. In further detail, each of the interface driver 27 and the interface driver 31 may operate communication protocols such as the iPod® Accessory Protocol (iAP or iAP2) over USB or other wired or wireless serial or point-to-point interface.

Figure 3:
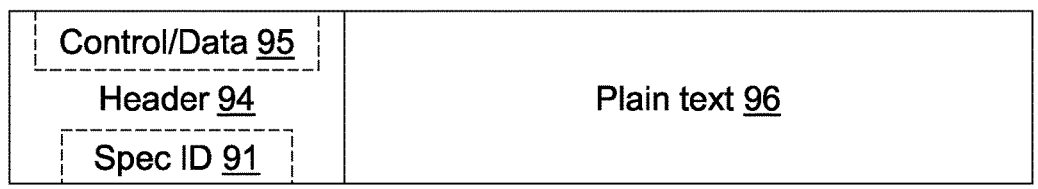
FIG. 3 depicts a data packet containing plain text.

With brief reference to FIG. 3 in conjunction with FIGS. 2A and 2B, the communication protocol may define a header 94 that must be included in packets 90 provided from the barcode sled reader 9 to the mobile device 8, and vice versa. The exemplary iAP/iAP2 header includes a control/data designation 95 which identifies whether the packet is a control packet or a custom data packet. If the control/data designation 95 of a packet 90 provided by the barcode sled reader 9 to the mobile device 8 indicates that the packet is a control packet, the interface driver 27 delivers the packet to the operating system 23.

If the control/data designation 95 indicates that the packet 90 is a custom data packet, the header 94 may further include a specification ID 91 which is a unique identifier assigned to the sled reader 9 and identifies the type of data 96 included in the header (i.e. the specifications to which the data 96 will conform) and communication protocols for communication of the type of data included in the data packet 90. If the control/data designation 95 of the packet provided by the barcode sled reader 9 to the mobile device indicates the packet is a data packet, the interface driver 27 delivers the packet to one of the relay application 20 or the non-legacy application 21 based on predefined criteria, such as which application is active on the user interface of the mobile device 8.

Figure 2C:
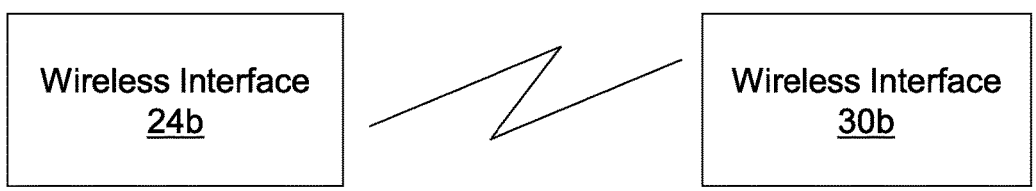
FIG. 2C depicts an embodiment where a barcode sled reader is coupled to a mobile device by a wireless link.

Turning briefly to FIG. 2C in conjunction with FIG. 2A, in one embodiment the barcode sled reader interface 24b and the mobile device interface 30b may be compatible point-to-point wireless communication interface such as Bluetooth® such that when a point-to-point wireless link is established data may be communicated between the processor 32 of the barcode sled reader 9 and processor 14 of the mobile device 8.

In more detail each of the interface driver 27 and the interface driver 31 may operate Bluetooth® communication protocols (typically referred to as a Bluetooth stack) to: i) establish a communication link between the wireless interface 24b and wireless interface 30b, ii) and enable application level communication between the processor 32 of the barcode sled reader 9 and processor 14 of the mobile device 8, which may be by way of USB framing or emulation.

Returning to FIG. 2A, the barcode reader 36 may be located within the barcode sled reader 9, capture an image of a barcode within a field of view, and buffer the captured image within a working portion of the memory 34. More specifically, operating a barcode reader driver 37, the processor 32 may control the illumination system to project illumination into the field of view while the image sensor 40 captures an image of the field of view (as focused onto the image sensor 40 by the imaging optic 42) and buffers the image to the memory 34.

The processor 32, operating the decoder 29, may receive image data from the barcode reader 36 representing the light incident upon the image sensor 40 (i.e. obtains the image buffered in memory 34), perform applicable processing, and output decoded data representing the image of the barcode focused onto the imaging sensor 40 by the imaging optic 42.

More specifically, the processor 32 operating the decoder 29 receives the image data, analyzes the image data to determine the data encoded in the barcode, and outputs the decoded image data. For example, the decoded image data may be a numeric, alphabetic, or alphanumeric string of characters identifying, e.g., a product, part, component, etc. The output may be a serial number, product identifier, product name, computer interpretable instruction, or any other suitable output. The barcode image data may be decoded according to a predefined criteria. The predefined criteria may be, e.g., a standard such as Universal product code (UPC) or any other symbology suitable for reading a barcode to determine the information contained in the barcode.

The barcode sled reader 9 provides the decoded image data as plain text to the mobile device 8 via the interface between the barcode sled reader interface 24 and the mobile device interface 30. Plain text may refer to pure, unencrypted, and unformatted text. That is, plain text may refer to a pure sequence of character codes, encoded in a standard format such as ASCII or Unicode or one of their many derivatives. For example, plain text may not include formatted text such as text contained in an XML file, CSV file, DOC file, XLS file, or other similar formatted text file. Formatted text refers to text enhanced with stylistic or marking information, such as a language identifier, font size, color, or hypertext links, and not being universally readable.

With reference to FIG. 3, plain text decoded image data 96 may be encapsulated in a data packet 90, which in conformity with iAP or iAP2 may include a header 94, a control/data designation 95 indicating that the packet 90 is a custom data packet, and a specification ID associated with the barcode sled reader and designating a particular data specification with which the plain text data 96 complies.

The network interface 22 of the mobile device 8 may include wireless hardware, Wi-Fi or cellular data, and software components commonly referred to as a TCP/IP stack. The processor 14 when executing the relay application 20, utilizes the network interface 22 to establish a TCP/IP connection with a legacy system tool 39 operating on the intermediary device 10 over network 13.

In operation, each time the relay application 20 receives decoded image data 90 from the barcode sled reader 9 through the connection between the barcode sled reader interface 24 and the mobile device interface 30: i) the relay application 20 provides an application level acknowledgement back to the barcode sled reader 90 though the connection between the barcode sled reader 9 and the mobile device 8; and ii) the decoded image data 96 is forwarded to the system tool 39 without further processing by the relay application. More specifically, plain text 96 received from the barcode sled reader 9 is the same plain text 96 that is transferred from the mobile device 8 to the legacy system tool 39 of the intermediary device 10. That is, the plain text 96 received from the barcode sled reader 9 is not combined with other data prior to being transferred from the mobile device 8 to the legacy system tool of the intermediary device 10.

In addition to sending decoded image data to the intermediary device 10, the mobile device 8 may also transmit decoded image data to a non-legacy system 12 using a non-legacy application 21 executed by the processor 14 and stored in the non-transitory computer readable medium 18 of the mobile device 8. Unlike the legacy system 11, the non-legacy system 12 may receive decoded image data of a barcode directly from the mobile device 8 via a TCP/IP connection by way of the non-legacy application 21, which is communicatively compatible with the non-legacy system 12.

The non-legacy system 12, however, requires the decoded image data of the barcode to be formatted into a specific format by the non-legacy application 21. The specific format may be, e.g., XML, CSV, XLS, or a proprietary format for communication between the non-legacy application 21 and the non-legacy system 12. For example, upon receiving decoded image data as plain text from the barcode sled reader 9, the non-legacy application 21 formats the decoded image data into a different format. The formatted image data is also combined with other data prior to being transmitted by the mobile device 8 to the non-legacy system 12.

It should be noted that the above described components of the mobile device 8 are encased within a mobile device housing. The above described components of the barcode sled reader 9 are encased within a housing of the barcode sled reader 9, which is distinct from the housing of the mobile device 8. Further, the barcode sled reader housing 9 may include a recess into which the mobile device 8 may be inserted for physically mating the hardware power/data connector 24*a* of the mobile device 8 to the hardware power/data connector 30*a* of the barcode sled reader 9.

With further reference to FIG. 2A, the intermediary device 10 may include: a user interface such as a display and keyboard, a network interface 64, a legacy system interface 68, a processor 66, and a non-transient computer readable medium 70 storing legacy system tool 39 and a tool application 71.

The network interface 64 may include hardware and software components to implement a TCP/IP stack and a hard wired (i.e. Ethernet) or wireless connection to the network 13 to establish the TCP/IP connection with the mobile device 8 and receive decoded barcode image data from the mobile device 8.

The legacy system interface 68 may, in certain embodiments wherein communication between the intermediary device 10 and the legacy system 12 is via TCP/IP, be the same component as network interface 64. In other embodiments the legacy system interface 68 may implement a proprietary communication link with a corresponding intermediary device interface 72 of the legacy system 12. It should be noted that even if TCP/IP is used for communication between the intermediary device 10 and the legacy system 12, the legacy system may still not accessible by the mobile device 8 via a TCP/IP connection.

In the exemplary embodiment, the processor 66 executing the tool application 71 drives a work flow (a menu managed sequence of text and/or graphic display forms displaying data and data entry fields for user input of data) on the user interface 59 facilitates a user performing tasks within a healthcare, commercial, or other work environment. More specifically, the legacy system 11 may provide information regarding the tasks to the processor 66 operating the tool application 71 which renders the information to the user on the user interface 59. The user interface 59, under control of the processor 66 executing the tool application 71 may include data entry fields for user input of data related to the tasks which are subsequently sent to the legacy system.

In the exemplary embodiment, the processor 66 executing the legacy system tool 39 operates in response to receiving decoded barcode image data from the mobile device 8 and provides the decoded barcode image data to the tool application 71. More specifically, the processor 66 executing the legacy system tool 39 places the plain text decoded barcode image data within the data entry field at which a cursor (not shown) is then currently positioned. In certain embodiments, the legacy system tool may add certain formatting to the plain text image data, such as adding a carriage return character, to automatically advance the cursor to a next data entry field upon entry of the decoded barcode image data.

The legacy system 11 may include an intermediary device interface 72, a processor 74, and a non-transient computer readable medium 76 storing a legacy application 78 executable by the processor 74.

In embodiments where the legacy system 11 communicates with the intermediary device 10 via TCP/IP the intermediary device interface 72 may include hardware and software components to implement a TCP/IP stack and a hard wired (i.e. Ethernet) or wireless connection to a network to establish a TCP/IP connection with the intermediary device 10. In other embodiments the intermediary device interface 72 may implement a proprietary communication link with the legacy system interface 69 of the intermediary device 10.

The processor 74 executing the legacy system application 78 may execute workflows that: i) drive the presentation of forms with fields via a tool application 71 operating on the intermediary device 10; and ii) store and manage data input to the tool application 71, including both data input by keyboard and decoded barcode image data input to the tool application 71 data entry fields by the legacy system tool 39, in a legacy system database (not shown).

As discussed, the legacy system 11 is not capable of receiving barcode data via a TCP/IP connection such as WI-FI directly from the mobile device 8. Rather, the legacy system may only receive data via communication with the tool application 71 operating on the intermediary device 10 via connection 15. As discussed, connection 15 may be a TCP/IP connection or a non-TCP/IP connection.

In the above description, each TCP/IP connection may refer to any Transmission Control Protocol (TCP) of the Internet protocol suite (IP), such as HTTP, HTTPS, SMTP, POP3, IMAP, SSH, FTP, and Telnet. In alternative, each reference to a TCP/IP connection could be replaced with a Unreliable Data Protocol (UDP) connection.

Figure 4:
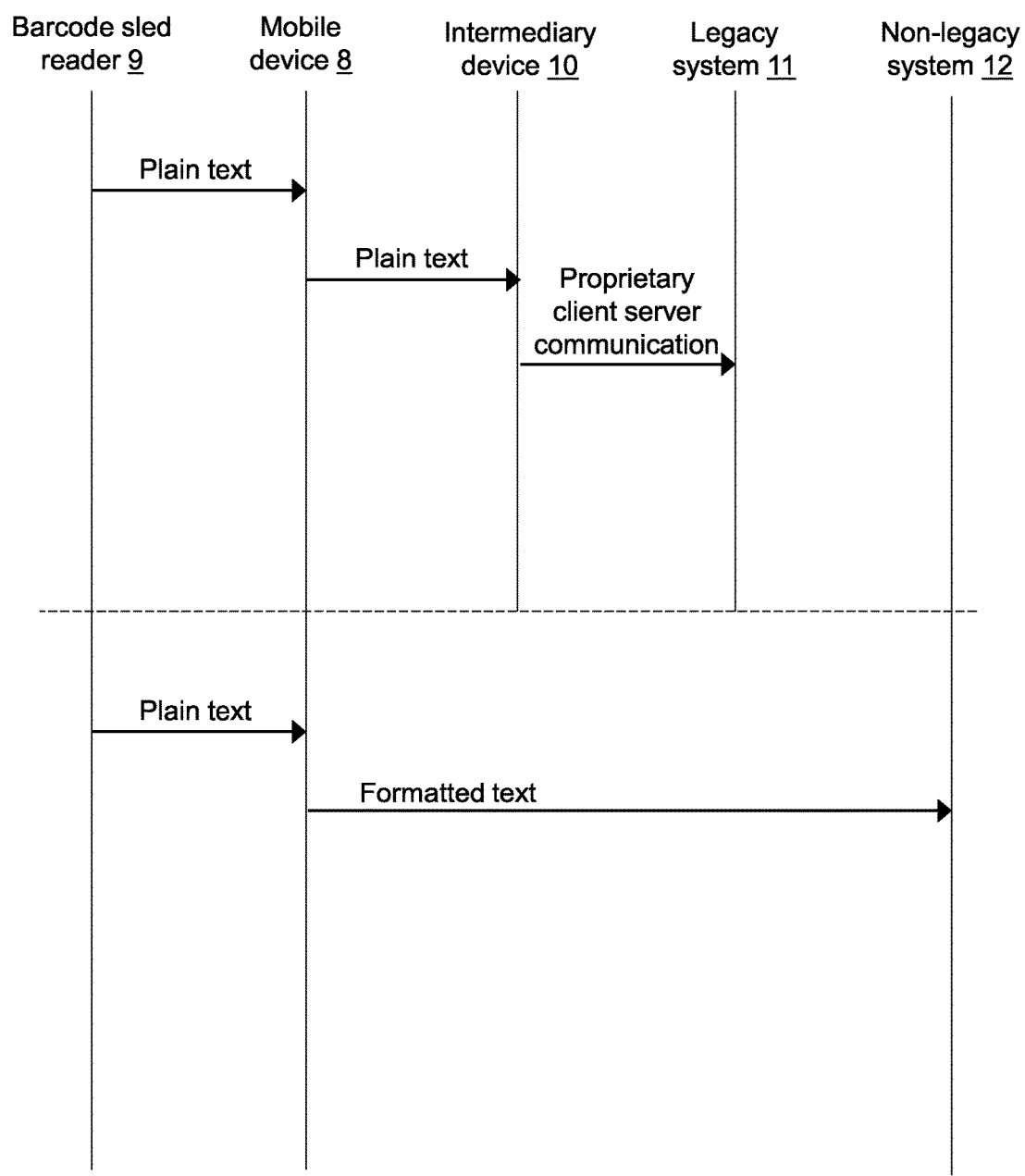
FIG. 4 depicts a ladder diagram showing the transfer of data within the barcode interface system of FIG. 2A and between the mobile device and a non-legacy system.

FIG. 4 depicts the transfer of decoded image data between the barcode sled reader 9, mobile device 8, intermediary device 10, legacy system 11, and non-legacy system 12. Above the dotted line in FIG. 4, the transfer of image data from the barcode sled reader 9 to the legacy system 11 is depicted. Below the dotted line, the transfer of image data from the barcode sled reader 9 to the non-legacy system 12 is shown.

When transferring data to the legacy system 11, the barcode sled reader 9 first transmits decoded image data to the mobile device 8 as plain text. The mobile device 8: i) provides an application level acknowledgment acknowledging receipt of the plain text back to the barcode sled reader 9; and ii) transmits the decoded image data to the intermediary device 10 as plain text. As described above, the intermediary device 10 may include the legacy system tool 39 which places the decoded data, as plain text, within the workflow of the tool application 71 on the intermediary device (i.e. placed into a data entry field of the user interface at the then current location of the cursor). The intermediary device 10 then transfers the decoded image data to the legacy system 11 via connection 15 as part of the workflow managed by a combination of the legacy system 11 and the tool application 71.

With reference to FIG. 4, below the dashed line, the transfer of image data to the non-legacy system 12 is shown. When transferring data to the non-legacy system 12, the barcode sled reader 9 first transmits decoded image data to the mobile device 8 as plain text. A non-legacy application 21 operating on the mobile device 8 formats the decoded image data (e.g., into XML formatted data) and transmits the formatted decoded image data to the non-legacy system 12 as part of the work flow on the mobile device 8 as managed by a combination of the non-legacy system 12 and the non-legacy application 21.

Figure 5:
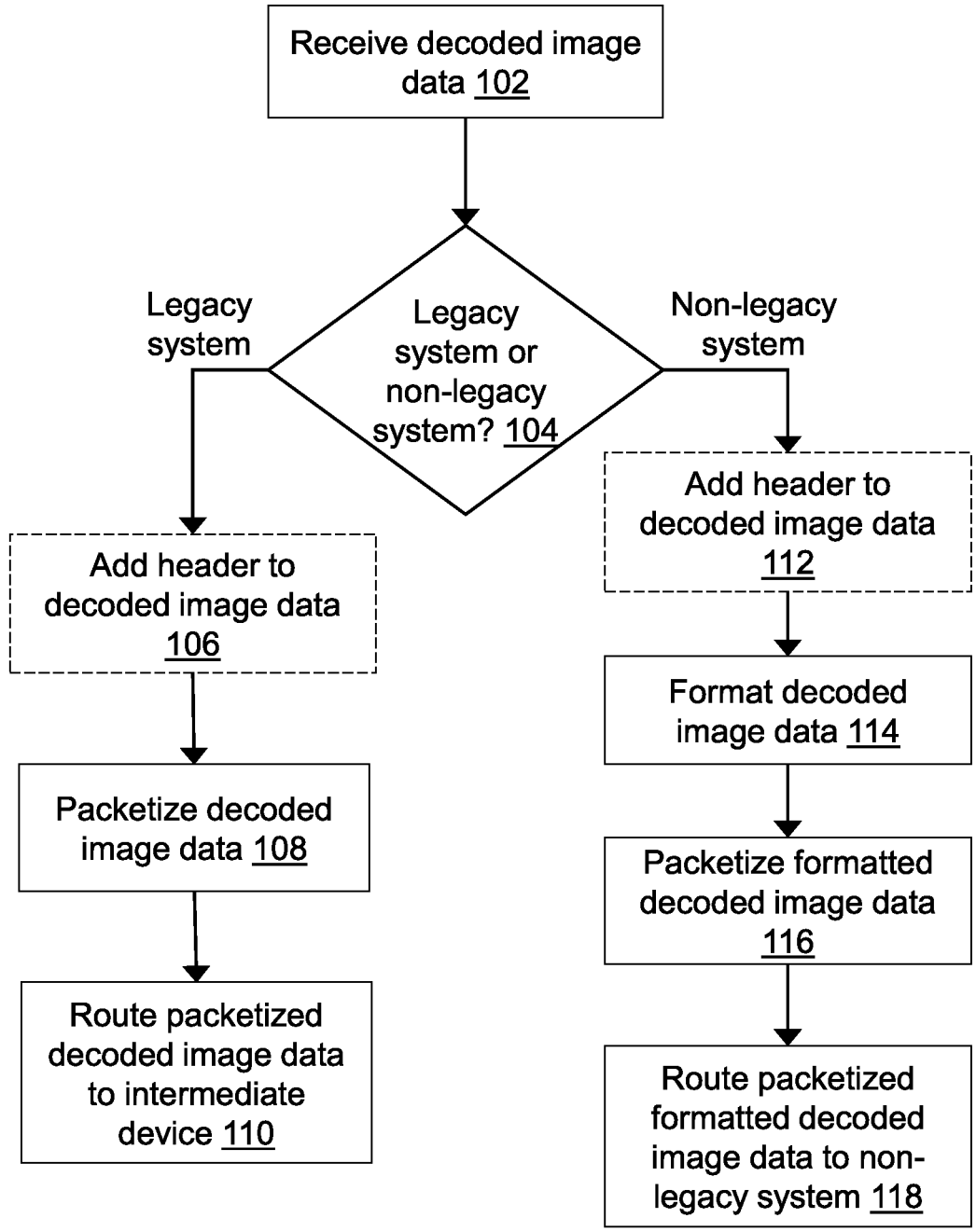
FIG. 5 depicts a flow diagram describing the transfer of decoded image data.

Turning to FIG. 5, the transfer of decoded image data is described. In processing block 102, decoded image data is received by the mobile device 8 from the barcode sled reader 9. In decision block 104, the processor 14 of the mobile device 8 determines if the received decoded image data is intended for the relay application 20 or the non-legacy application 21 operating on the mobile device 8. The processor 14 may determine the destination for the received decoded image data based on the current application being executed by the processor 14. For example, if the processor is executing the relay application 20, then the received decoded image data may be determined to be intended for the relay application 20. Alternatively, if the processor 14 is executing the non-legacy application 21 that transfers data to the non-legacy system 12, then the received decoded image data may be determined to be intended for the non-legacy application 21.

If the received decoded image data is intended for the relay application 20, then processing moves to processing block 106 under control of the relay application 20. In optional processing block 106, a header may be added to the decoded image data as described above. In processing block 108, the decoded image data is packetized by the processor 14 and/or the network interface 22 of the mobile device 8. In processing block 110, the packetized decoded image data is sent to the intermediate device 110. As described above, upon receiving the decoded image data, the intermediate device 10 transfers the decoded image data to the legacy system 11.

Alternatively, if the received decoded image data is intended for the non-legacy application 21, then processing moves to processing block 112 under control of the non-legacy application 21. In optional processing block 112, a header may be optionally added to the decoded image data as described above. In processing block 114, the decoded image data is formatted. In processing block 116, the formatted decoded image data is packetized by the processor 14 and/or the network interface 22 of the mobile device 8. In processing block 118, the packetized formatted decoded image data is sent to the non-legacy system 118.

As will be understood by one of ordinary skill in the art, the processor 14 and/or the decoding processor 32 may have various implementations. For example, the processor 14 and/or the decoding processor 32 may include any suitable device, such as a programmable circuit, integrated circuit, memory and I/O circuits, an application specific integrated circuit, microcontroller, complex programmable logic device, other programmable circuits, or the like. The processor 14 and/or the decoding processor 32 may also include a non-transitory computer readable medium, such as random access memory (RAM), a read-only memory (ROM), an erasable programmable read-only memory (EPROM or Flash memory), or any other suitable medium. Instructions for performing the steps outlined above may be stored in the non-transitory computer readable medium and executed by the processor 14 and/or the decoding processor 32. The processor 14 and/or the decoding processor 32 may be communicatively coupled to a computer readable medium through a system bus, mother board, or using any other suitable structure known in the art. The processor 14 and/or the decoding processor 32 may, e.g., comprise a multi-core processor, a single processor, and/or multiple processors acting alone or in conjunction with one another.

As will be understood by one of ordinary skill in the art, the image sensor 40 may comprise any device capable of capturing an image of a field of view. For example, the image sensor 40 may comprise any detector capable of measuring or quantifying light incident on the pixel array of the detector. The image sensor 40 may comprise, for example, a CCD sensor, CMOS sensor, or any device capable of measuring or quantifying light incident on the pixel array of the detector.

As will be understood by one of ordinary skill in the art, the imaging optic 42 may comprise a single lens, a series of lenses, a combination of optical components, or any other suitable structure for focusing lights onto an image sensor.

As will be understood by one of ordinary skill in the art, the housing may be composed of any suitable material and take any suitable shape. For example, the housing may be composed primarily of plastic, with different portions of the housing composed of metal, rubber, and glass.

The claims are not limited to the specific implementations described above. Various modifications, changes and variations may be made in the arrangement, operation and details of the implementations described herein without departing from the scope of the claims.

What is claimed is:

1. A barcode reading system for a mobile device, the barcode reading system including:
   a barcode sled reader configured to connect to the mobile device, the barcode sled reader including:
      a barcode reader configured to generate image data of a barcode; and
      a decoding processor configured to receive the image data from the barcode reader, decode the image data, and send the decoded image data to the mobile device;
   a relay application stored on a non-transitory computer readable medium of the mobile device and executed by a processor of the mobile device;
   a tool application executed by a processor of an intermediary device and in communication with a legacy system, wherein:
      the relay application and the tool application are each configured to perform a Transmission Control Protocol (TCP) to establish and maintain a TCP/Internet Protocol (IP) connection there-between over an IP network for transport of decoded image data provided by the barcode sled reader;
      the relay application is configured to:
         each time it receives decoded image data from the barcode sled reader forward the decoded image data to the tool application via the TCP/IP connection; and
      the tool application is configured to receive the decoded image data from the relay application via the TCP/IP connection and provide the decoded image data to the legacy system via a transport distinct from the TCP/IP connection.

2. The barcode reading system of claim 1, wherein the legacy system is not accessible by the mobile device via a TCP/IP connection.

3. The barcode reading system of claim 1, wherein the tool application provides the decoded barcode image data to the legacy system by a keyboard interface that emulates input of the decoded barcode image data, as text, into a data entry field of a user interface form as text at a then current location of a text cursor.

4. The barcode reading system of claim 1, wherein:
the mobile device includes a hardware data connector;
the barcode sled reader includes a corresponding hardware data connector coupled to the hardware data connector of the mobile device and forming a data interface between the barcode sled reader and the mobile device; and
the barcode sled reader sends the decoded image data to the relay application through data interface between the barcode sled reader and the mobile device.

5. The barcode reading system of claim 1, wherein:
the mobile device includes a point-to-point wireless interface;
the barcode sled reader includes a corresponding point-to-point wireless interface forming a wireless data link between the barcode sled reader and the mobile device; and
the barcode sled reader sends the decoded image data to the relay application through wireless data link between the barcode sled reader and the mobile device.

\* \* \* \* \*